(12) United States Patent
Okada et al.

(10) Patent No.: US 7,414,083 B2
(45) Date of Patent: Aug. 19, 2008

(54) INK FOR INK-JET RECORDING

(75) Inventors: Mayuko Okada, Toyota (JP); Masaya Fujioka, Nagoya (JP); Shunichi Higashiyama, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 425 days.

(21) Appl. No.: 10/668,574

(22) Filed: Sep. 23, 2003

(65) Prior Publication Data

US 2004/0059021 A1   Mar. 25, 2004

(30) Foreign Application Priority Data

Sep. 24, 2002   (JP) .............................. 2002-277600

(51) Int. Cl.
*C09D 11/00* (2006.01)

(52) U.S. Cl. ...................................... 523/160; 523/161

(58) Field of Classification Search ................. 523/160, 523/161; 106/31.85
See application file for complete search history.

(56) References Cited

U.S. PATENT DOCUMENTS

| | | | | | |
|---|---|---|---|---|---|
| 5,667,569 | A | * | 9/1997 | Fujioka ................... | 106/31.58 |
| 5,746,818 | A | * | 5/1998 | Yatake .................... | 106/31.86 |
| 5,851,280 | A | * | 12/1998 | Belmont et al. ............ | 106/472 |
| 6,379,443 | B1 | * | 4/2002 | Komatsu et al. .......... | 106/31.58 |
| 6,440,203 | B2 | * | 8/2002 | Kato ......................... | 106/31.6 |
| 6,488,753 | B1 | * | 12/2002 | Ito et al. .................... | 106/31.9 |
| 7,063,970 | B1 | * | 6/2006 | Johansen et al. ........... | 435/183 |
| 2002/0043179 | A1 | | 4/2002 | Norimatsu et al. | |
| 2003/0008080 | A1 | | 1/2003 | Doi et al. | |
| 2003/0073759 | A1 | * | 4/2003 | Koga et al. ................. | 523/160 |
| 2003/0078338 | A1 | * | 4/2003 | Schlarb et al. ............. | 524/556 |
| 2003/0144375 | A1 | * | 7/2003 | Wu et al. .................... | 523/160 |
| 2004/0020407 | A1 | * | 2/2004 | Kato ......................... | 106/31.6 |
| 2004/0024086 | A1 | * | 2/2004 | Segawa et al. ............. | 523/160 |
| 2004/0080594 | A1 | * | 4/2004 | Ohira et al. ................. | 347/100 |
| 2005/0020730 | A1 | * | 1/2005 | Valentini et al. ............ | 523/160 |

FOREIGN PATENT DOCUMENTS

| | | | |
|---|---|---|---|
| JP | 08300886 A | * | 11/1996 |
| JP | 10-120955 | | 5/1998 |
| JP | 2000-144028 | | 5/2000 |
| JP | 2000-169769 | | 6/2000 |
| JP | 2002-53784 | | 2/2002 |
| JP | 2004-35718 | | 2/2004 |

* cited by examiner

*Primary Examiner*—Edward J Cain
(74) *Attorney, Agent, or Firm*—Reed Smith LLP

(57) ABSTRACT

An ink for ink-jet recording contains tripropylene glycol normal butyl ether or dipropylene glycol normal propyl ether, an acrylic polymer, a water-insoluble coloring agent, and water. The ink simultaneously satisfies the straight travel stability of ink droplets during the discharge with an ink-jet recording apparatus, the recovery performance upon introduction into a recording head of the ink-jet recording apparatus, the fixation performance of printed matters, and the drying performance after the printing.

8 Claims, 1 Drawing Sheet

INK FOR INK-JET RECORDING

BACKGROUND OF THE INVENTION

1. Field of the Invention

The present invention relates to an ink for ink-jet recording to be used for an ink-jet recording apparatus.

2. Description of the Related Art

In the ink-jet recording system, ink droplets are formed by means of the ink discharge method including, for example, the electrostatic attraction method, the method in which mechanical vibration or displacement is applied to the ink by using a piezoelectric element or the like, and the method in which bubbles are generated by heating the ink to utilize the pressure generated thereby. All or a part of the ink droplets are adhered to a recording objective material such as paper to perform the recording. Those usable as the ink for ink-jet recording to be used for the ink-jet recording system as described above include those which are obtained by dissolving or dispersing a variety of water-soluble dyes or pigments in water or a liquid medium composed of water and a water-soluble organic solvent. In particular, the ink for ink-jet recording, which is based on the use of the pigment, is excellent, for example, in the water resistance and the light resistance as compared with the dye ink.

It is required for the ink for ink-jet recording based on the use of the pigment as described above, for example, that the minute discharge nozzle of the ink-jet printer is not clogged; the fixation performance (abrasion resistance, finger touch resistance) of printed matters is improved; the drying performance after the printing is improved; and the storage performance is improved so that the pigment particles are not coagulated or sedimented and no solid matter other than the pigment is deposited even the ink is stored for a long period of time at a high temperature or at a low temperature.

In order to perform the ink-jet recording in a normal discharge state with an ink-jet printer when the ink cartridge is installed for the first time and when the ink cartridge is exchanged, it is necessary that the ink for ink-jet recording is introduced into the ink flow passage without allowing any bubble to remain therein, and it is necessary that any bubble remaining in the ink flow passage is completely removed. For this purpose, the forcible ink-sucking/discharging operation for removing the bubbles, which is called "purge", is usually performed in the ink-jet printer. However, in general, it is difficult to obtain the normal discharge state by means of only the effect of the purge operation as described above. It is necessary that the ink for ink-jet recording itself has excellent recovery performance upon introduction into the recording head.

In view of the above, a method is widely used, in which an acrylic polymer is added into the ink for ink-jet recording. Accordingly, it is possible to improve the recovery performance upon introduction into the recording head and the fixation performance of printed matters. For example, Japanese Patent Application Laid-open No. 10-120955 discloses an ink for ink-jet recording obtained by adding a self-dispersing copolymer resin composed of stearyl (meth)acrylate, (meth)acrylic acid, styrene-based monomer, and benzyl (meth)acrylate-based monomer. Japanese Patent Application Laid-open No. 2000-169769 discloses an ink for ink-jet recording obtained by dispersing or dissolving a self-dispersing type pigment and a copolymer composed of acrylic acid and maleic acid or anhydride thereof in an aqueous medium.

However, when the acrylic polymer as described above is added in such an amount that the effect is obtained as described above, then the discharge from the recording head becomes unstable, and the straight travel stability of ink droplets is deteriorated immediately after the start of the printing operation. A problem has arisen such that all of the fixation performance of printed matters, the recovery performance upon introduction into the recording head, and the straight travel stability of ink droplets during the discharge cannot be satisfied sufficiently by adjusting only the amount of addition of the acrylic polymer.

SUMMARY OF THE INVENTION

The present invention has been made in order to solve the problem as described above, an object of which is to provide an ink for ink-jet recording which is excellent in the straight travel stability of ink droplets during the discharge, the recovery performance upon introduction into the recording head, the fixation performance of printed matters, and the drying performance after the printing. Another object of the invention is to provide an ink cartridge accommodating the ink of the invention.

According to a first aspect of the present invention, there is provided an ink for ink-jet recording containing tripropylene glycol normal butyl ether, an acrylic polymer, a water-insoluble coloring agent, and water. According to a second aspect of the present invention, there is provided an ink for ink-jet recording containing dipropylene glycol normal propyl ether, an acrylic polymer, a water-insoluble coloring agent, and water. According to the present invention, there is also provided an ink cartridge which accommodates the ink according to the first or second aspect. The ink cartridge may be of a type capable of being detachably attached to an ink head, or of a type capable of being detachably attached to a frame of an ink-jet printer. In the case of the latter, the ink is supplied from the ink cartridge to a printing head via a flexible ink tube.

DESCRIPTION OF THE PREFERRED EMBODIMENTS

Figure 1:
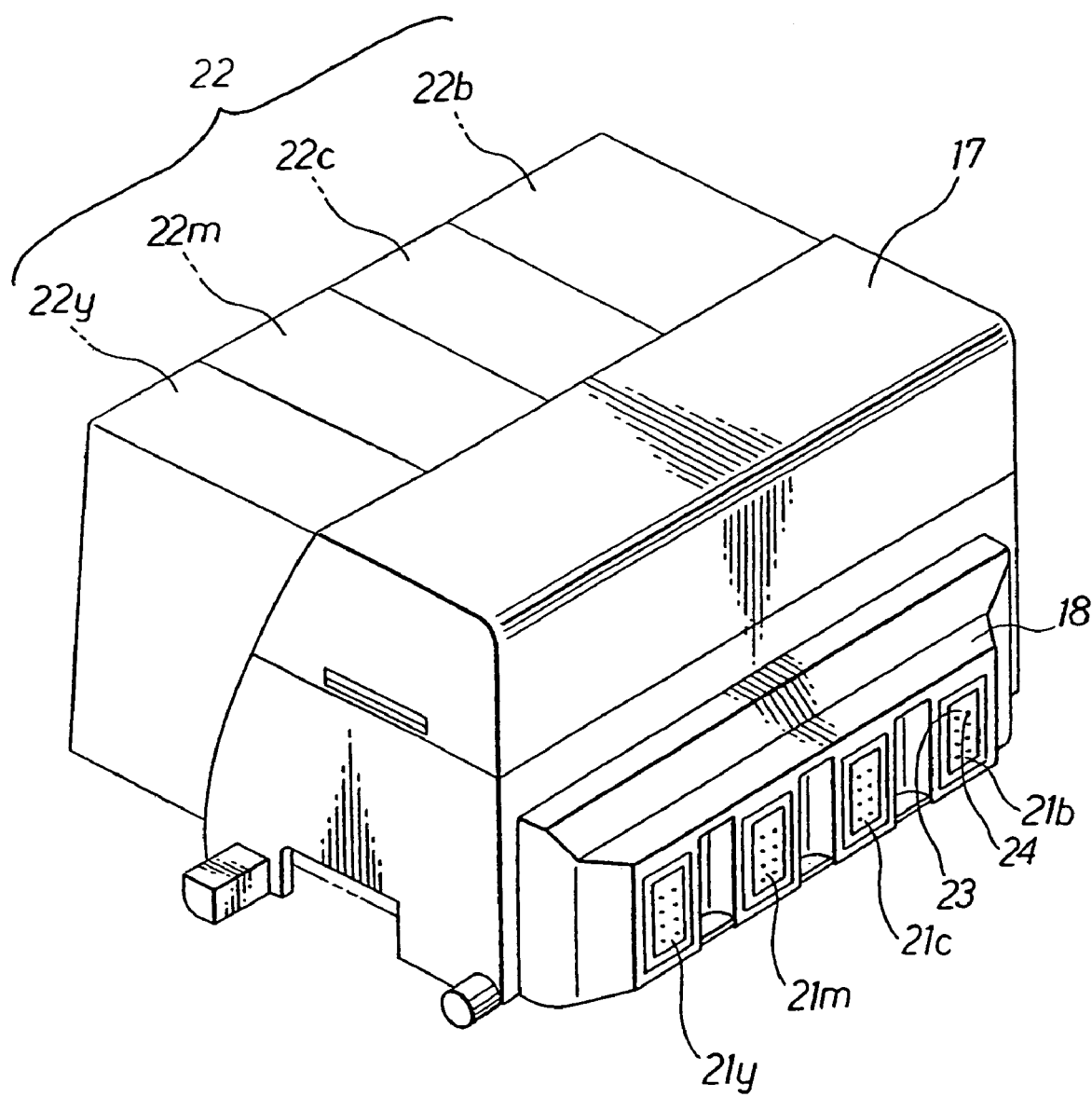
FIG. 1 shows an ink jet head which ejects four color inks and is provided with a color ink cartridge which contains the ink in accordance with the invention.

The ink for ink-jet recording of the present invention contains the acrylic polymer. Owing to the acrylic polymer contained in the ink, the fixation performance of printed matters and the recovery performance upon introduction into the recording head are excellent when the recording is performed by using the ink for ink-jet recording of the present invention, probably for the following reason. That is, it is considered that the acrylic polymer in the ink is adsorbed to the surface of the coloring agent by the aid of the functional group which has the affinity to the coloring agent, the acrylic polymer is also adsorbed to the recording objective material when the printing is performed on the recording objective material, and thus the acrylic polymer consequently functions as a binding agent for the recording objective material and the coloring agent to successfully make the contribution to the improvement of the fixation performance of printed matters. Further, it is considered that the acrylic polymer is adsorbed to the surface of the coloring agent, the bubbles, which are adhered to the surface of the coloring agent to remain thereon, are substituted and excluded thereby, and thus the acrylic polymer also successfully make the contribution to the improvement of the recovery performance upon introduction into the recording head, while the recovery performance upon introduction into the recording head would be otherwise deteriorated by the most principal cause of the bubbles remaining in the ink.

The acrylic polymer is not specifically limited. Those commercially available may include, for example, JURYMER AC-103 and JURYMER AC-107 (produced by Nihon Junyaku Co., Ltd.), BYK 154 and BYK 155 (produced by BYK Chemie), AQUALIC LS-20 (produced by Nippon Shokubai Co., Ltd.), PRIMAL I-100 (produced by ROHM AND HAAS), and KC-324-1 (produced by Arakawa Chemical Industries, Ltd.).

The blending amount of the acrylic polymer is selected depending on the type and the molecular weight of the acrylic polymer. However, the blending amount is preferably 0.1 to 5.0% by weight with respect to the total amount of the ink for ink-jet recording of the present invention. If the blending amount is less than 0.1% by weight, the fixation performance of printed matters and the recovery performance upon introduction into the recording head are insufficient in some cases. If the blending amount exceeds 5% by weight, then the viscosity of the ink for ink-jet recording of the present invention is increased in some cases, and the storage performance is deteriorated in other cases.

The ink for ink-jet recording of the present invention contains the tripropylene glycol normal butyl ether and/or the dipropylene glycol normal propyl ether. As a result of diligent investigations performed by the present inventors, it has been found out that the straight travel stability of ink droplets can be made satisfactory during the discharge of the ink for ink-jet recording containing the acrylic polymer by avoiding the localization of the acrylic polymer in the vicinity of the surface of the ink. As a method for achieving the satisfactory straight travel stability, it has been found out that the tripropylene glycol normal butyl ether and/or the dipropylene glycol normal propyl ether, which has the surface activity stronger than that of the acrylic polymer and which has the hydrophobicity stronger than that of the acrylic polymer, is contained. Thus, the present invention has been completed. That is, in ordinary cases, an excessive amount of the acrylic polymer, which is not adsorbed to the coloring agent, has been localized by the surface activity in the vicinity of the surfaces of the ink droplets (gas-liquid interfaces and solid-liquid interfaces) in the ink for ink-jet recording containing the acrylic polymer. Therefore, when the ink droplets are adhered to portions disposed around the nozzle of the recording head, and the water is evaporated, then the concentration of the acrylic polymer is extremely increased in the vicinity of the surfaces of the ink droplets to form sticky or cohesive residues having high viscosities which behave as the obstacle to inhibit the straight travel stability of the ink droplets during the discharge of the ink from the nozzle. When the tripropylene glycol normal butyl ether and/or the dipropylene glycol normal propyl ether is contained in the ink for ink-jet recording containing the acrylic polymer, the tripropylene glycol normal butyl ether and/or the dipropylene glycol normal propyl ether exists in the vicinity of the surfaces of the ink droplets in place of the acrylic polymer, because the ethers have the strong surface-activating function as compared with the acrylic polymer. As a result, the localization of the acrylic polymer is avoided on the ink droplet surfaces. Therefore, even when the ink droplets adhere to the portions disposed around the nozzle of the recording head, and the water is evaporated, then the sticky or cohesive residues, which would be otherwise formed by the acrylic polymer, are not produced, and it is possible to obtain the satisfactory straight travel stability of the ink droplets during the discharge. Further, the tripropylene glycol normal butyl ether and/or the dipropylene glycol normal propyl ether also has such an effect that the permeability into the recording objective material such as paper is enhanced, and the drying after the printing is quickened, in addition to the surface-activating function as described above.

It is preferable that the blending amount of the tripropylene glycol normal butyl ether and/or the dipropylene glycol normal propyl ether is 0.2 to 10% by weight with respect to the total amount of the ink for ink-jet recording of the present invention. If the blending amount is less than 0.2% by weight, the straight travel stability of ink droplets during the discharge is insufficient in some cases. If the blending amount exceeds 10% by weight, the permeability of the ink for ink-jet recording of the present invention is excessively increased. As a result, the optical density of printed matters is lowered in some cases, and the ink for ink-jet recording of the present invention arrives at the back surface of the recording objective material. More preferably, the blending amount is 0.5 to 5% by weight. In view of the function of the tripropylene glycol normal butyl ether and/or the dipropylene glycol normal propyl ether, the blending ratio of the tripropylene glycol normal butyl ether and/or the dipropylene glycol normal propyl ether with respect to the acrylic polymer is preferably 0.5 to 2 on the basis of the weight.

The ink for ink-jet recording of the present invention is excellent in the recovery performance upon introduction into the recording head and in the fixation performance of printed matters owing to the acrylic polymer contained therein. Further, owing to the tripropylene glycol normal butyl ether and/or the dipropylene glycol normal propyl ether contained in the ink for ink-jet recording of the present invention, it is possible to avoid the deterioration of the straight travel stability of ink droplets during the discharge which would be otherwise deteriorated by the cause of the acrylic polymer, and it is possible to obtain the excellent drying performance after the printing.

The ink for ink-jet recording of the present invention contains the water-insoluble coloring agent. The water-insoluble coloring agent is not specifically limited provided that the water-insoluble coloring agent is dispersible in the aqueous phase. The water-insoluble coloring agent may include, for example, carbon black, organic pigments, inorganic pigments, and coloring agents obtained by staining polymer with dye. In particular, it is preferable to use self-dispersing type carbon black. When the self-dispersing type carbon black is contained as the water-insoluble coloring agent, then it is unnecessary for the ink for ink-jet recording of the present invention to consider the interaction between the acrylic polymer and a dispersing agent to be used in order to disperse the coloring agent, and it is possible to select the acrylic polymer from those included in a wide range. The organic pigment is not specifically limited, which may include, for example, azo pigments such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as basic dye type lake and acidic dye type lake; nitro pigments; nitroso pigments; and aniline black daylight fluorescent pigments. The inorganic pigment is not specifically limited, which may include, for example, titanium oxide and iron oxide pigment.

It is preferable that the blending amount of the coloring agent is 0.1 to 20% by weight with respect to the total amount of the ink for ink-jet recording of the present invention. The blending amount of the coloring agent is more preferably 0.3 to 15% by weight and much more preferably 0.5 to 10% by weight.

The ink for ink-jet recording of the present invention contains water. The water may be ordinary water. However, it is preferable to use those having high purities such as ion exchange water and distilled water. It is preferable that the blending amount of the water is 10 to 98% by weight with respect to the total amount of the ink for ink-jet recording of the present invention. The blending amount of the water is more preferably 30 to 97% by weight and much more preferably 35 to 90% by weight.

It is allowable that the ink for ink-jet recording of the present invention further contains, for example, known substances to improve the liquid stability, dispersing agents, viscosity-adjusting agents, surface tension-adjusting agents, pH-adjusting agents, and antiseptic/fungicidal agents, if necessary. The term "liquid stability" described above refers to the effect (moistening effect) to avoid the drying of the ink for ink-jet recording at the nozzle of the recording head of the ink-jet printer.

The substance to improve the liquid stability is not specifically limited, which may include, for example, polyvalent alcohols such as ethylene glycol, diethylene glycol, triethylene glycol, polyethylene glycol, 1,3-butanediol, 1,5-pentanediol, 1,6-hexanediol, glycerol, 1,2,6-hexanetriol, 1,2,4-butanetriol, and 1,2,3-butanetriol; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The substance to improve the liquid stability as described above may be used singly. Alternatively, two or more of the substances to improve the liquid stability as described above may be used in combination. The blending amount of the substance to improve the liquid stability is determined in a wide range depending on desired characteristics and compositions of the ink for ink-jet recording of the present invention. However, the blending amount is preferably not more than 40% by weight. More preferably, the blending amount is 2 to 30% by weight.

When the ink for ink-jet recording of the present invention is applied to the ink-jet recording system in which the recording liquid is charged, it is allowable to contain specific resistance-adjusting agents such as inorganic salts including, for example, lithium chloride, ammonium chloride, and sodium chloride. When the ink for ink-jet recording of the present invention is applied to the ink-jet recording system in which the ink is discharged in accordance with the action of thermal energy, thermal physical values including, for example, the specific heat, the coefficient of thermal expansion, and coefficient of thermal conductivity may be adjusted.

The ink for ink-jet recording of the present invention simultaneously contains the acrylic polymer and the tripropylene glycol normal butyl ether and/or the dipropylene glycol normal propyl ether. Accordingly, the ink for ink-jet recording of the present invention is excellent in the straight travel stability of ink droplets during the discharge, the recovery performance upon introduction into the recording head, the fixation performance of printed matters, and the drying performance after the printing.

EXAMPLES

The present invention will be explained in further detail below as exemplified by Examples. However, the present invention is not limited to only Examples.

Example 1

A composition, which had a formulation or composition shown in Table 1, was obtained by blending polyacrylic acid sodium salt having a weight average molecular weight of 5,000 to 8,000 as the acrylic polymer and blending tripropylene glycol normal butyl ether and other components. The composition was sufficiently mixed and agitated, followed by being filtrated through a membrane filter having a pore diameter of 1 µm. Thus, an ink for ink-jet recording (ink-jet recording ink) was prepared.

TABLE 1

| Example 1 | % by weight |
|---|---|
| Pure water | 39.7 |
| CAB-O-JET 300 Black (produced by Cabot, solid content: 5% by weight) | 33.3 |
| Polyacrylic acid sodium salt | 0.5 |
| Tripropylene glycol normal butyl ether | 1 |
| Glycerol | 25.5 |

Example 2

An ink-jet recording ink was prepared in the same manner as in Example 1 except that ammonium salt of styrene-acrylic acid copolymer having an acid value of 215 and a weight average molecular weight of 8,500 was used in place of polyacrylic acid sodium salt as the acrylic polymer. Table 2 shows a composition of the ink-jet recording ink prepared in Example 2.

TABLE 2

| Example 2 | % by weight |
|---|---|
| Pure water | 39.7 |
| CAB-O-JET 300 Black (produced by Cabot, solid content: 5% by weight) | 33.3 |
| Ammonium salt of styrene-acrylic acid copolymer | 0.5 |
| Tripropylene glycol normal butyl ether | 1 |
| Glycerol | 25.5 |

Example 3

An ink-jet recording ink was prepared in the same manner as in Example 1 except that ammonium salt of acrylic copolymer (BYK 154 produced by BYK Chemie) was used in place of polyacrylic acid sodium salt as the acrylic polymer. Table 3 shows a composition of the ink-jet recording ink prepared in Example 3.

TABLE 3

| Example 3 | % by weight |
|---|---|
| Pure water | 39.7 |
| CAB-O-JET 300 Black (produced by Cabot, solid content: 5% by weight) | 33.3 |
| Ammonium salt of acrylic copolymer | 1 |
| Tripropylene glycol normal butyl ether | 0.5 |
| Glycerol | 25.5 |

Example 4

An ink-jet recording ink was prepared in the same manner as in Example 1 except that dipropylene glycol normal propyl ether was used in place of tripropylene glycol normal butyl ether. Table 4 shows a composition of the ink-jet recording ink prepared in Example 4.

TABLE 4

| Example 4 | % by weight |
| --- | --- |
| Pure water | 39.7 |
| CAB-O-JET 300 Black (produced by Cabot, solid content: 5% by weight) | 33.3 |
| Polyacrylic acid sodium salt | 0.5 |
| Dipropylene glycol normal propyl ether | 1 |
| Glycerol | 25.5 |

Example 5

An ink-jet recording ink was prepared in the same manner as in Example 1 except that salt of copolymer of acrylic acid/sulfonic acid monomer having a weight average molecular weight of 8,000 (AQUALIC LS-20 produced by Nippon Shokubai Co., Ltd.) was used in place of polyacrylic acid sodium salt as the acrylic polymer. Table 5 shows a composition of the ink-jet recording ink prepared in Example 5.

TABLE 5

| Example 5 | % by weight |
| --- | --- |
| Pure water | 38.7 |
| CAB-O-JET 300 Black (produced by Cabot, solid content: 5% by weight) | 33.3 |
| Salt of copolymer of acrylic acid/sulfonic acid monomer | 1.5 |
| Dipropylene glycol normal propyl ether | 1 |
| Glycerol | 25.5 |

Comparative Example 1

An ink-jet recording ink was prepared in the same manner as in Example 1 except that the blending amount of pure water was increased without using any acrylic polymer. Table 6 shows a composition of the ink-jet recording ink prepared in Comparative Example 1.

TABLE 6

| Comparative Example 1 | % by weight |
| --- | --- |
| Pure water | 40.2 |
| CAB-O-JET 300 Black (produced by Cabot, solid content: 5% by weight) | 33.3 |
| Polyacrylic acid sodium salt | — |
| Tripropylene glycol normal butyl ether | 1 |
| Glycerol | 25.5 |

Comparative Example 2

An ink-jet recording ink was prepared in the same manner as in Example 1 except that the blending amount of pure water was increased without using any tripropylene glycol normal butyl ether. Table 7 shows a composition of the ink-jet recording ink prepared in Comparative Example 2.

TABLE 7

| Comparative Example 2 | % by weight |
| --- | --- |
| Pure water | 40.7 |
| CAB-O-JET 300 Black (produced by Cabot, solid content: 5% by weight) | 33.3 |
| Polyacrylic acid sodium salt | 0.5 |
| Tripropylene glycol normal butyl ether | — |
| Glycerol | 25.5 |

Comparative Example 3

An ink-jet recording ink was prepared in the same manner as in Comparative Example 2 except that the blending amount of pure water was decreased while blending tripropylene glycol methyl ether as the permeating agent. Table 8 shows a composition of the ink-jet recording ink prepared in Comparative Example 3.

TABLE 8

| Comparative Example 3 | % by weight |
| --- | --- |
| Pure water | 37.7 |
| CAB-O-JET 300 Black (produced by Cabot, solid content: 5% by weight) | 33.3 |
| Polyacrylic acid sodium salt | 0.5 |
| Tripropylene glycol methyl ether | 3 |
| Glycerol | 25.5 |

Comparative Example 4

An ink-jet recording ink was prepared in the same manner as in Comparative Example 2 except that the blending amount of pure water was decreased while blending diethylene glycol diethyl ether as the permeating agent. Table 9 shows a composition of the ink-jet recording ink prepared in Comparative Example 4.

TABLE 9

| Comparative Example 4 | % by weight |
| --- | --- |
| Pure water | 39.7 |
| CAB-O-JET 300 Black (produced by Cabot, solid content: 5% by weight) | 33.3 |
| Polyacrylic acid sodium salt | 0.5 |
| Diethylene glycol diethyl ether | 1 |
| Glycerol | 25.5 |

Comparative Example 5

An ink-jet recording ink was prepared in the same manner as in Comparative Example 2 except that the blending amount of pure water was decreased while blending triethylene glycol dimethyl ether as the permeating agent. Table 10 shows a composition of the ink-jet recording ink prepared in Comparative Example 5.

TABLE 10

| Comparative Example 5 | % by weight |
| --- | --- |
| Pure water | 35.7 |
| CAB-O-JET 300 Black (produced by Cabot, solid content: 5% by weight) | 33.3 |

TABLE 10-continued

| Comparative Example 5 | % by weight |
|---|---|
| Polyacrylic acid sodium salt | 0.5 |
| Triethylene glycol dimethyl ether | 5 |
| Glycerol | 25.5 |

Comparative Example 6

An ink-jet recording ink was prepared in the same manner as in Comparative Example 5 except that that salt of copolymer of acrylic acid/sulfonic acid monomer having a weight average molecular weight of 8,000 (AQUALIC LS-20 produced by Nippon Shokubai Co., Ltd.) was used in place of polyacrylic acid sodium salt as the acrylic polymer. Table 11 shows a composition of the ink-jet recording ink prepared in Comparative Example 6.

TABLE 11

| Comparative Example 6 | % by weight |
|---|---|
| Pure water | 34.7 |
| CAB-O-JET 300 Black (produced by Cabot, solid content: 5 % by weight) | 33.3 |
| Salt of copolymer of acrylic acid/sulfonic acid monomer | 1.5 |
| Triethylene glycol dimethyl ether | 5 |
| Glycerol | 25.5 |

Evaluation

The ink-jet recording inks prepared in Examples 1 to 5 and Comparative Examples 1 to 6 were evaluated as follows respectively. An ink-jet recording apparatus (MULTI-FUNCTION CENTER "MFC-5100J" produced by Brother Industries, Ltd.) having an on-demand type multi-head, in which liquid droplets were generated by applying the pressure brought about by the vibration of a piezoelectric element to the ink-jet recording ink contained in a recording head to perform the recording, was used for the evaluation.

Recovery Performance upon Introduction into Recording Head

The evaluation was made in accordance with the following criteria for the ratio of discharge nozzles with respect to the total number of discharge nozzles after exchanging the ink cartridge and performing the purge operation (suction of the ink by using the pump equipped for the main printer body) three times. +: the ratio of discharge nozzles was 100%. ±: the ratio of discharge nozzles was not less than 90%. −: the ratio of discharge nozzles was less than 90%.

Straight Travel Stability of Ink Droplets during Discharge

The evaluation was made in accordance with the following criteria for the ratio of discharge nozzles with satisfactory straight travel stability of ink droplets with respect to the total number of discharge nozzles by printing a single line with each one of all of the nozzles after continuously performing the printing on ten sheets of regular paper. +: the ratio of discharge nozzles with satisfactory straight travel stability of ink droplets was 100%. ±: the ratio of discharge nozzles with satisfactory straight travel stability of ink droplets was not less than 90%. −: the ratio of discharge nozzles with satisfactory straight travel stability of ink droplets was less than 90%.

Fixation Performance of Printed Matters

The printing was performed on ink-jet recording paper (Kodak Premium Picture Paper (Gross) produced by Kodak), followed by being dried for 24 hours at normal temperature and normal humidity. After that, the printed matters after 24 hours were rubbed with a finger to observe the degree of blur and stain of the printed matters. The evaluation was made in accordance with the following criteria. +: neither blurring nor stain was caused at all. ±: the blurring and the stain were observed a little. −: the blurring and the stain were observed conspicuously.

Drying Performance of Printed Matters

The printing was performed on regular paper (XEROX 4200 produced by Xerox), and then the printed matters were rubbed with a finger to measure the period of time until the ink-jet recording ink was not adhered to the finger. The evaluation was made in accordance with the following criteria. +: the drying was effected within 5 seconds. ±: the drying was effected within 60 seconds. −: the drying was not effected within 60 seconds. Results of the evaluation are shown in Table 12.

TABLE 12

|  | Example | | | | | Comparative Example | | | | | |
|---|---|---|---|---|---|---|---|---|---|---|---|
|  | 1 | 2 | 3 | 4 | 5 | 1 | 2 | 3 | 4 | 5 | 6 |
| Recovery performance upon introduction | + | + | + | + | + | − | + | + | + | + | + |
| Straight travel stability | + | + | + | + | + | + | − | − | − | − | − |
| Fixation performance | + | + | + | + | + | − | + | + | + | + | + |
| Drying performance | + | + | + | + | + | + | − | ± | ± | ± | ± |

The ink-jet recording inks prepared in Examples 1 to 5 successfully obtained the satisfactory results in any one of the evaluation tests of the recovery performance upon introduction into the recording head, the straight travel stability of ink droplets, the fixation performance of printed matters, and the drying performance of printed matters. On the other hand, the ink-jet recording inks prepared in Comparative Examples 1 to 6 had any problem in the result of any one of the evaluation tests. According to this fact, it has been successfully confirmed that the ink-jet recording ink, which is excellent in the straight travel stability of ink droplets during the discharge, the recovery performance upon introduction into the recording head, the fixation performance of printed matters, and the drying performance after the printing, can be obtained by using the combination of the acrylic polymer and the tripropylene glycol normal butyl ether or the dipropylene glycol normal propyl ether. In Examples described above, the tripropylene glycol normal butyl ether or the dipropylene glycol normal propyl ether was used. However, the tripropylene glycol normal butyl ether and the dipropylene glycol normal propyl ether may be used simultaneously.

An embodiment of an ink cartridge which contains the ink in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21b, 21c, 21m, 21y which communicate with the compartment 22b, 22c, 22m, 22y to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet. The ink cartridge may be placed independent from the ink jet head. For example, the ink cartridge may be provided on the ink jet printer frame and be connected with the ink jet head by a flexible tube through which the ink is passed.

According to the present invention, it is possible to provide the ink for ink-jet recording which is excellent in the straight travel stability of ink droplets during the discharge, the recovery performance upon introduction into the recording head, the fixation performance of printed matters, and the drying performance after the printing.

What is claimed is:

1. An ink for ink-jet recording comprising tripropylene glycol normal butyl ether, an acrylic polymer, a water-insoluble coloring agent, and water;
    wherein a blending ratio of the tripropylene glycol normal butyl ether with respect to the acrylic polymer is 0.5 to 2 on the basis of weight; and
    wherein a content of the acrylic polymer is 0.1 to 5% by weight with respect to a total amount of the ink.

2. The ink for ink-jet recording according to claim 1, wherein the water insoluble coloring agent is self-dispersing carbon black.

3. The ink for ink-jet recording according to claim 1, wherein a content of the tripropylene glycol normal butyl ether is 0.5 to 5% by weight with respect to a total amount of the ink.

4. An ink cartridge comprising the ink as defined in claim 1.

5. An ink for ink-jet recording comprising dipropylene glycol normal propyl ether, an acrylic polymer, a water-insoluble coloring agent, and water;
    wherein a blending ratio of the dipropylene glycol normal propyl ether with respect to the acrylic polymer is 0.5 to 2 on the basis of weight; and
    wherein a content of the acrylic polymer is 0.1 to 5% by weight with respect to a total amount of the ink.

6. The ink for ink-jet recording according to claim 5, wherein the water-insoluble coloring agent is self-dispersing type carbon black.

7. The ink for ink-jet recording according to claim 5, wherein a content of the dipropylene glycol normal propyl ether is 0.5 to 5% by weight with respect to a total amount of the ink.

8. An ink cartridge comprising the ink as defined in claim 5.

* * * * *